UNITED STATES PATENT OFFICE.

WALTER J. WAYTE, OF PHILADELPHIA, PENNSYLVANIA, ASSIGNOR TO THE AMERICAN AGRICULTURAL CHEMICAL COMPANY, A CORPORATION OF CONNECTICUT.

DEFECATANT AND PROCESS OF MAKING SAME.

1,088,751.

Specification of Letters Patent. Patented Mar. 3, 1914.

No Drawing. Application filed January 24, 1913. Serial No. 744,010.

*To all whom it may concern:*

Be it known that I, WALTER J. WAYTE, a citizen of the United States, residing in the city of Philadelphia, county of Philadelphia, and State of Pennsylvania, have invented certain new and useful Improvements in Defecatants and Processes for Making the Same, of which the following is a specification.

My invention relates to a material whose principal use is in the defecation of sugar solutions in the manufacture of sugar; and my invention relates also to the process of producing this defecating material.

This material comprises infusorial earth, diatomaceous earth or kieselguhr charged with phosphoric acid, $P_2O_5$.

By my invention I apply to a mass of kieselguhr, or material similar thereto as above stated, a dilute solution of phosphoric acid of a specific gravity of 1.1 to a maximum of 1.2, though solutions of less density may be used. A solution of such density is cheaply obtainable, as compared with a concentrated solution of greater specific gravity than 1.2. It is of great importance that a solution of specific gravity of 1.2 or less is of sufficient fluidity to be drawn into all the innermost pores of the kieselguhr by its capacity or affinity for moisture. I preferably use the same weight of the phosphoric acid solution as the weight of the kieselguhr to which it is applied, in each treatment. The kieselguhr then has a capacity sufficient to take up all the moisture without leaving any excess or free surface moisture. I apply the acid solution to the kieselguhr in such quantity that all the moisture is completely taken up by the kieselguhr. The kieselguhr so treated is then heated to drive off this moisture leaving in the pores the phosphoric acid. The kieselguhr can then be treated one or more additional times with similar dilute acid solution, in each case only so much solution being applied as will be completely taken up by the kieselguhr without leaving external or excess moisture; and after each application of solution the moisture may be driven off by heating. Or the dilute acid may be applied to the kieselguhr in a continuous process, as distinguished from the several steps above described. The result is kieselguhr having throughout its pores and in the innermost pores a filling of phosphoric acid which, according to circumstances or desires ranges from say 10% to 40% phosphoric acid. Substantially 25% phosphoric acid is the preferred proportion in the finished article.

It has heretofore been proposed to apply concentrated phosphoric acid solution of 1.7 to 1.75 specific gravity to kieselguhr. Such an acid solution is thick or syrupy and for that reason the kieselguhr cannot, with its affinity for moisture, draw the viscous solution into all its pores and into the innermost pores. The subsequent drying results in kieselguhr with acid only partially permeating its pores and a coating of acid upon the outer surface of the kieselguhr. The result is a product which has a high percentage of phosphoric acid, which is decidedly hygroscopic with the result that the material readily absorbs large quantities of moisture from the atmosphere or its surroundings making the same pasty; and with this moisture absorbed from the atmosphere, and a large part of the acid being only on the surface of the kieselguhr the external pasty acid attacks metallic containers or vessels. With my product however the acid is within the pores of the kieselguhr, in relatively smaller percentage, and is not at all or only slightly hygroscopic; and since the acid is entirely within the pores, whatever moisture is taken up is held by the kieselguhr, is not free or surface moisture, and there being no coating of the acid upon the outside surfaces of the kieselguhr, there is no attack upon metallic or other containers.

I have found that when the percentage of phosphoric acid is 40% or more the product is hygroscopic to such an extent as to produce chemical action upon the part of the acid with metallic or other containers. From the foregoing it is apparent that by employing acid solution of specific gravity of not more than 1.2, the acid is carried entirely within the pores of the kieselguhr and does not form a coating upon the surface; that acid of such density is far cheaper than concentrated acid; and that my product is not hygroscopic and will not chemically attack a metallic or other container.

What I claim is:

1. The process of charging kieselguhr with phosphoric acid, which consists in treating kieselguhr with a solution of phosphoric acid of specific gravity not exceeding 1.2 in such quantity that the moisture of said solution is completely taken up by the kieselguhr.

2. The process of charging kieselguhr with phosphoric acid, which consists in treating kieselguhr with a solution of phosphoric acid of specific gravity not exceeding 1.2 in such quantity that the moisture of said solution is completely taken up by the kieselguhr, and driving such moisture off from the kieselguhr.

3. The process of charging kieselguhr with phosphoric acid, which consists in treating a mass of kieselguhr with a solution of phosphoric acid not exceeding 1.2 specific gravity, driving the moisture of the solution off from the kieselguhr, and repeating these steps until the kieselguhr is charged with phosphoric acid of a weight not exceeding 40% of the weight of the kieselguhr.

4. A substantially non-hygroscopic mixture of kieselguhr and phosphoric acid of a weight not exceeding 40% of the weight of the kieselguhr.

In testimony whereof I have hereunto affixed my signature in the presence of the two subscribing witnesses.

WALTER J. WAYTE.

Witnesses:
N. DUNNING,
ALFRED S. REEVES.